United States Patent [19]

Picart

[11] Patent Number: 5,745,736
[45] Date of Patent: Apr. 28, 1998

[54] INFORMATION PROCESSING SYSTEM WHEREIN PROCESSING TASKS ARE PRIORITIZED AND PERFORMED IN ORDER OF PRIORITY

[75] Inventor: Catherine Picart, Wissous, France

[73] Assignee: U.S. Philips Corporation, New York, N.Y.

[21] Appl. No.: 611,704

[22] Filed: Mar. 6, 1996

[30] Foreign Application Priority Data

Mar. 15, 1995 [FR] France ................................ 95 03013

[51] Int. Cl.⁶ ........................... G06F 13/372; G06F 13/24
[52] U.S. Cl. ........................ 395/500; 395/673; 395/737
[58] Field of Search ............................... 395/500, 670, 395/673, 737; 364/514 R; 375/219, 222

[56] References Cited

U.S. PATENT DOCUMENTS

| | | | |
|---|---|---|---|
| 4,943,942 | 7/1990 | Dunnion | 364/900 |
| 5,001,480 | 3/1991 | Ferry et al. | 341/108 |
| 5,261,099 | 11/1993 | Bigo et al. | 395/650 |
| 5,371,849 | 12/1994 | Peaslee et al. | 395/162 |
| 5,530,875 | 6/1996 | Wach | 395/737 |
| 5,621,800 | 4/1997 | Weng et al. | 380/49 |
| 5,628,018 | 5/1997 | Matsuzaki et al. | 395/733 |

FOREIGN PATENT DOCUMENTS 0209178  1/1987  European Pat. Off. .......... H03C 1/06

*Primary Examiner*—Kevin J. Teska
*Assistant Examiner*—Russell W. Frejd
*Attorney, Agent, or Firm*—Leroy Eason

[57] ABSTRACT

The system according to the invention forms part of a modem that is constituted, on the one hand, by a signal processor (60) to which is connected a read-only memory (65) and, on the other hand, by supplementary circuits such as a digital/analog converter (20) for supplying the transmission signals to the telephone line (9) and an analog/digital converter (30) for digitizing the analog signals coming from the telephone line (9). The conversions are performed at rates determined by clocks (20) and (30). Task series (CH1, CH2) bearing different degrees of priority are associated to these signals. The invention resolves the priority conflicts by closely examining the clock signals and by executing first the tasks that have the highest priority (TR1 for series CH1 and REC1 for series CH2) if the close examination of the signals proves them to have priority and then, when no priority is detected, the other tasks (TR2, GES for series CH1 and REC2 and REC3 for series CH2).

4 Claims, 2 Drawing Sheets

INFORMATION PROCESSING SYSTEM WHEREIN PROCESSING TASKS ARE PRIORITIZED AND PERFORMED IN ORDER OF PRIORITY

TECHNICAL FIELD

This invention relates to information processing which includes at least two series of tasks having different degrees of priority.

BACKGROUND OF THE INVENTION

Information processing systems in which at least two series of tasks are to be executed with different degrees of priority, and which depend for initiation thereof on respective events that have different priorities, are well known. Such a system may form part of telecommunication elements, for example modems, in which there are real-time processing requirements that can tolerate very little or even no delay for the execution of certain tasks. In European Patent Application No. 0 209 178 there is a description of such a system used in radio navigation. Therein the different tasks to be performed by a processor are triggered by various interrupt signals applied thereto. This implies that certain tasks already being executed are interrupted and so measures must be taken for protecting the context of these already executing tasks upon the occurrence of an interrupt. These protection measures, which take processor time, reduce processor effectiveness and are considered a drawback.

SUMMARY OF THE INVENTION

The aforesaid problem can be overcome by a system wherein there are provided:
- detectors of priority events situated in at least one of the series, for triggering the execution of tasks of one or more tasks of another series that can be assigned to the detected event,
- interrupt codes for indicating a position of the interrupt in the series, and
- interrupt code detectors in the sequencing of tasks to come back to the position in the series at which the interrupt occurred.

These and other aspects of the invention will be apparent from and elucidated with reference to the embodiments described hereinafter.

DESCRIPTION OF PREFERRED EMBODIMENTS

Figure 1:
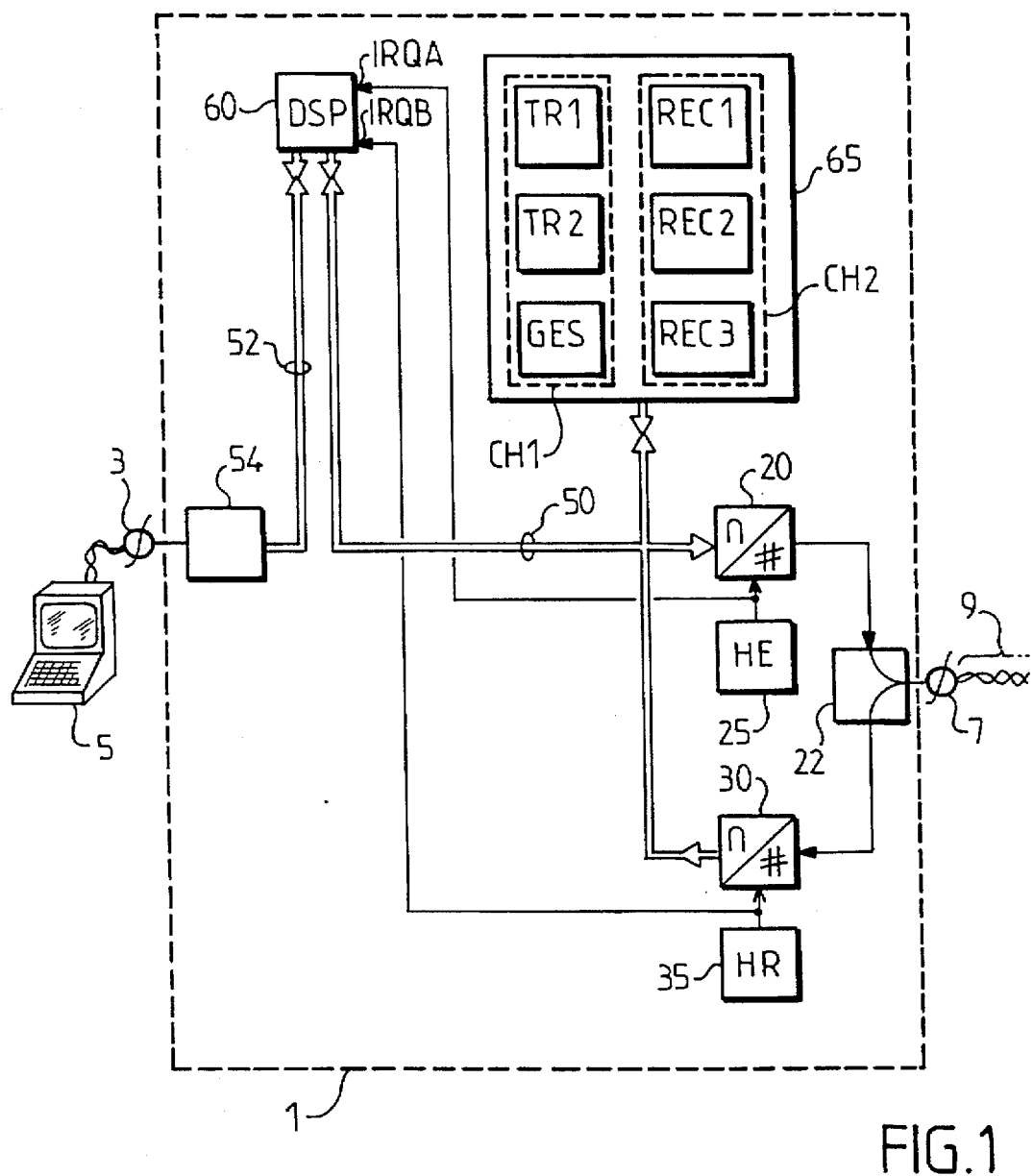
FIG. 1 shows a modem comprising a data processing system according to the invention.

In FIG. 1 is shown a system including a modem 1 arranged in accordance with the invention. The modem 1 has first accesses 3 for connection to a terminal 5, and second accesses 7 for connection to a telephone line 9. The analog signals transmitted on telephone line 9 come from a digital-to-analog converter 20 via a hybrid circuit 22. These signals are transmitted in accordance with the signal HE of a transmitting clock 25. The signals received from line 9 are applied to an analog-to-digital converter 30 via the same hybrid circuit 22. The signals are digitized in timing with the signal HR of a receiving clock 35, substantially equal to that of the signal HE. The various digital data coming from the converter 30 or which were applied to converter 20 are transported over a common data line 50. An interface unit 54 ensures the connection between a line 52 and the terminal 5. A signal processor 60, such as the 5600-type by Motorola, processes the data in accordance with the invention in cooperation with a read-only memory 65 which contains various instructions relating to tasks to be executed. All the data are transported more particularly by lines 50 and 52.

Figure 2:
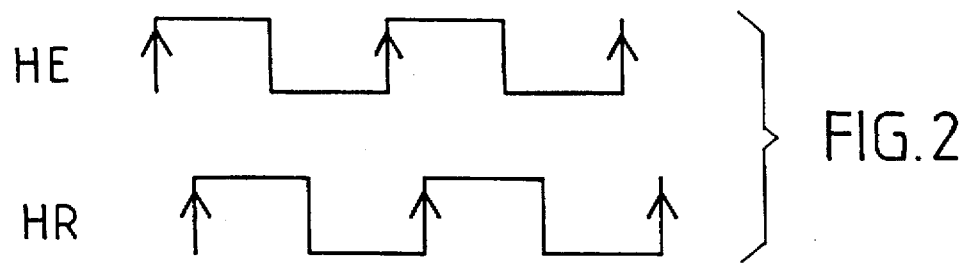
FIG. 2 shows the shape of clock signals which trigger priority tasks.

The various tasks to be performed relate to conventional modem functions and need not be discussed in detail. They are organized into series, and each series is assigned to an external event. Such an external event is, for example, the rising edge of signals HE and HR whose shape is represented in FIG. 2. The first series CH1 is assigned to the signal HE and the second series SH2 is assigned to the signal HR.

For the first series CH1 the tasks are TR1, GES, and TR2, described as follows:

TR1 is the first transmission task, which has the highest priority of the series. It relates generally to modulation of the digital data coming from the terminals by a carrier, and more particularly to the transformation of the data into samples and transmission of the samples to the converter 20.

GES is a task takes up very little real time and may relate to tests which imply few instructions and, therefore, follows task TR1.

TR2 is the second transmission task, of lower priority than task TR1. It relates to echo cancellation. The echo canceller is an adaptive filter whose convergence period coincides with a highly reduced receiving task. The moment the convergence has been effected, the adaptation of the filter is a slow process and becomes a task of low priority.

For the second series CH2 the tasks are REC1, REC2, and REC3, described as follows:

REC1 is the first receiving task, which has the highest priority of this series. It relates to the reading and filtering of the samples which come from the converter 30.

REC2 is the second receiving task, which has less priority than task REC1. It relates to the demodulation of the samples and to their transformation into digital data destined for terminal 5.

REC3 is the third receiving task, which has less priority than task REC2. It relates to the adaptation of the coefficients of the equalizer, of which the convergence coincides with a highly reduced transmission task. The moment the convergence has been effected, the adaptation is slowed down and becomes a low priority. This task also includes calculation of the line quality and detection of events which need not be taken into account for reasons of priority.

For managing the whole sequencing of these tasks, various flags are used.

The flag "flg0" indicates, if equal to "1", the necessity of executing series CH1, and more particularly, the task TR1. This flag is set to "1" when a rising edge of the signal HE occurs. The signal HE is applied to an input IRQA of the processor 60. This flag thus constitutes a detector of a priority event.

The flag "flg1" indicates, if equal to "1", the necessity of executing series CH2, and more particularly, the task REC1.

This flag is set to "1" when a rising edge of the signal HR2 occurs. This signal HR is applied to an input IRQB of processor 60. This flag thus also constitutes a detector of a priority event.

The following flags constitute interrupt codes for indicating the position of an interrupt that has appeared in the series, flg5: this indicates that the series CH1 has been interrupted and thus that the task TR1 has been carried out.

flg6: this indicates an interrupted receiving task between the tasks REC1 and REC2, or that REC1 has been carried out.

flg7: this indicates an interrupt between the tasks REC2 and REC3 and that REC2 has thus been carried out.

Figure 3:
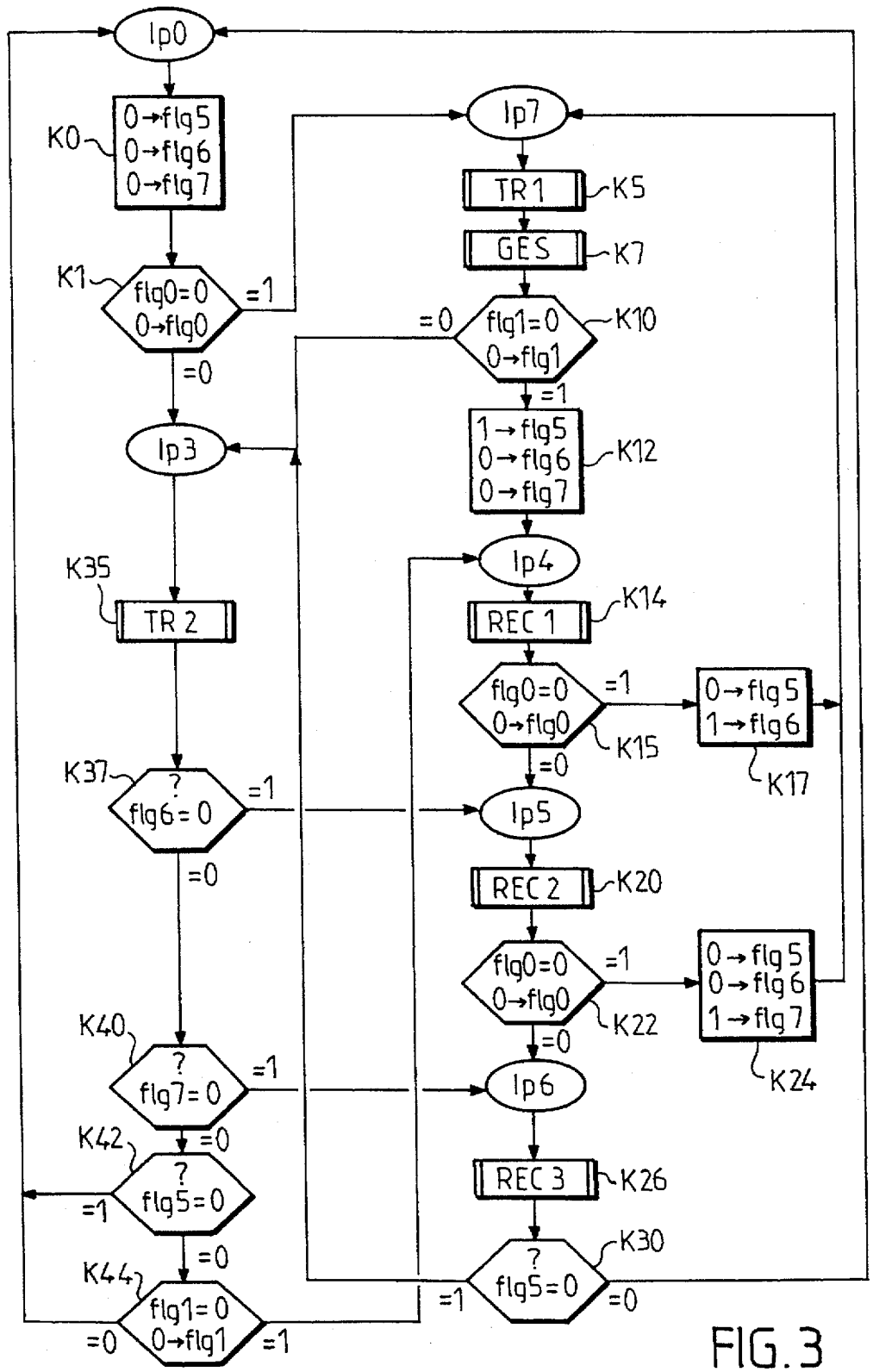
FIG. 3 shows a flow chart which explains the operation of the modem of the preceding Figure.

The flow chart of FIG. 3 will now be explained.

The sequencing commences at box K0 where the flags flg5, flg6 and flg7 are initialized at "0". Box K1 tests whether the clock signal HE has assumed the value "1". This test resets the value of flag flg0 to zero. If this value is "1", one must forthwith undertake the execution of task TR1 of the series CH1, since task TR1 has the highest priority. This task is executed as indicated in box K7. Another task, GES, indicated in box K7, can also be undertaken because it does not take up too much time.

When the task TR1 has been executed, in box K10 there is tested whether the value of the clock signal HR has assumed the value "1". If so, the value "1" is given to the flag flg5 and the value "0" to the flags flg6 and flg7 in box K12, before the priority task REC1 of the series CH2 is executed in box K14. Then a test is again made, in box K15, of the value of the clock signal HE, to determine whether the clock signal has assumed the value "1". If that is the case, the values "0" and "1" are given to the respective flags flg5 and flg6. Then box K5 is proceeded to and the process continues as described above.

If the clock signal HE has not assumed the value "1", series CH2 is not left. Therefore, from box K15 the sequence proceeds to box K20 in which is executed the task REC2, which has a lower priority level than task REC1. After the task REC2 has been executed, another test is made, in box K22, of the rising edge of the clock signal HE. If it has indeed assumed the value "1", a return is made to box K5 after the flags flg5, flg6 and flg7 have been set in Box 24 to "0", "0" and "1" respectively, which will make it possible to avoid carrying out again the tasks already carried out in the same time slot. If there has not been a renewed rising edge of signal HE, then task REC3, which is of low priority, can be executed as indicated in box K26.

Then a test is made in box K30 of the value of flag flg5. If this flag is zero, a return is made to box K0. If this flag has the value "1", that denotes that the task TR1 has been carried out and so one must attempt to carry out the task TR2 as shown in box K35. When task TR2 has been carried out, the value of flag flg6 is tested in box K37. If this value is equal to "1", box K20 is proceeded to, and if not, box K40 is proceeded to in order to test the value of flag flg7. If the value of flg7 is "1", box K26 is proceeded to, if not, box K42 is proceeded to. In this box K42 the flag flg5 is tested. If its value is "1", box K0 is returned to and if not, box K44 is proceeded to. In box K44 the flag flg1 is examined. If it is equal to "1", box K14 is proceeded to, and if not, a return is made to box K0.

I claim:

1. A method of processing a stream of information in accordance with at least two series of sequential processing tasks, each of said series being executed in order of priority based on occurrence in said stream of priority determinative events respectively assigned to the respective series; said method comprising:

detecting the presence in said stream of a priority determinative event during execution of one of said series, and in response thereto interrupting execution of tasks in said one series and initiating execution of one or more of the tasks in an other of said series to which the detected event is assigned;

detecting in said one series an interrupt code indicative of the position therein at which said interruption occurred; and following execution of one or more of the tasks in said other series, resuming execution of tasks in said one series commencing at the position therein indicated by said interrupt code.

2. A method as claimed in claim 1, wherein the occurrence of a priority determinative event during execution of said one series is signified by setting a flag which is triggered by said event.

3. A method as claimed in claim 1, for use in a modem having a transmission clock and a receiving clock, said one series of tasks relating to data transmission and being synchronized by said transmission clock, and said other series of tasks relating to data reception and being synchronized by said receiving clock.

4. A method as claimed in claim 3, wherein the tasks in said one series include at least one of: modulation of digital data, transmission of modulated digital data to a digital-to-analog converter, and echo cancellation.

* * * * *